Figure 1:
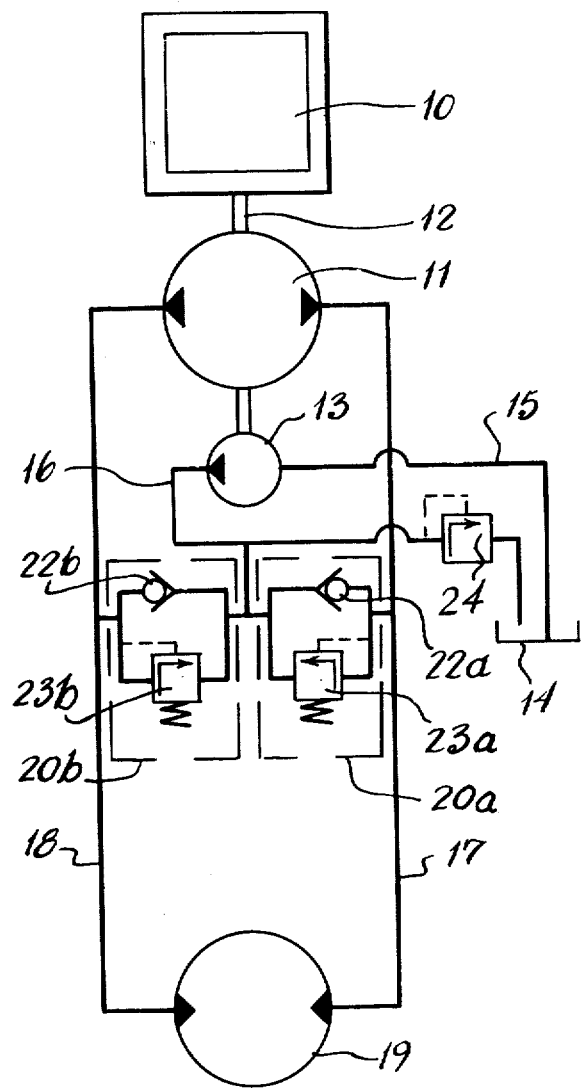

United States Patent [19]

Pensa

[11] 4,013,093
[45] Mar. 22, 1977

[54] HYDRAULIC VALVES

[75] Inventor: Carlo Pensa, Como, Italy

[73] Assignee: Massey-Ferguson Services N.V., Curacao, Netherlands Antilles

[22] Filed: Nov. 14, 1975

[21] Appl. No.: 632,131

[30] Foreign Application Priority Data

Nov. 18, 1974 United Kingdom ............ 49872/74

[52] U.S. Cl. ........................... 137/491; 137/493
[51] Int. Cl.² ................................. F16K 7/10
[58] Field of Search .......... 137/491, 493, 489, 492, 137/492.5

[56] References Cited

UNITED STATES PATENTS

| | | |
|---|---|---|
| 3,090,398 | 5/1963 | Adams ............................. 137/491 |
| 3,268,220 | 8/1966 | Williamson .................... 137/491 X |
| 3,710,824 | 1/1973 | Luhbauer ...................... 137/491 X |
| 3,783,891 | 1/1974 | Christianson .................... 137/491 |

*Primary Examiner*—Alan Cohan
*Attorney, Agent, or Firm*—Thomas P. Lewandowski

[57] ABSTRACT

A valve which may operate as either a check valve or a relief valve includes a chamber which is connected to a first hydraulic conduit by a restricted passage. A relief valve vents the chamber at a predetermined pressure to unbalance the valve member and allow fluid to flow from the first conduit to a second. The valve member is made with a telescoping portion to allow reverse flow when the first conduit is at a lower pressure than the second.

9 Claims, 2 Drawing Figures

HYDRAULIC VALVES

This invention relates to valves.

When operating closed hydraulic circuits it is necessary to ensure that relief valves are provided to vent pressurised fluid at a predetermined maximum level. It is also necessry to ensure that any loss of fluid in the circuit is replenished to prevent cavitation and subsequent damage. This is accomplished by use of a check valve in a low pressure zone of the circuit. Where the hydraulic circuit includes a reversible pump, either of the conduits connected to it may operate at high or low pressures. It is necessary therefore to provide two relief valves and two check valves. This increases the expense of the hydraulic circuit and also the bulk of the apparatus. It is an object of the present invention therfore to provide a valve which may operate in a plurality of modes.

According to the present invention there is provided a valve comprising a body; a valve member operable to control flow between two fluid conduits and movable within said body between a first position wherein said conduits are hydraulically disconnected and a second position wherein said conduits are hydraulically connected, the valve being arranged so that fluid pressure in said conduits acts upon said valve member to urge it toward said second position; a chamber hydraulically connected to one of said conduits by a restricted passage and arranged so that fluid pressure in said chamber acts to bias said valve member toward said first position and a relief valve assembly operable to allow flow of fluid from said chamber upon attainment of a predetermined pressure therein.

Preferably said valve member comprises first and second elements having resilient biasing means for urging said elements apart and stop means for limiting relative movement therebetween.

Preferably also said restricted passage is formed within said valve member.

Figure 2:
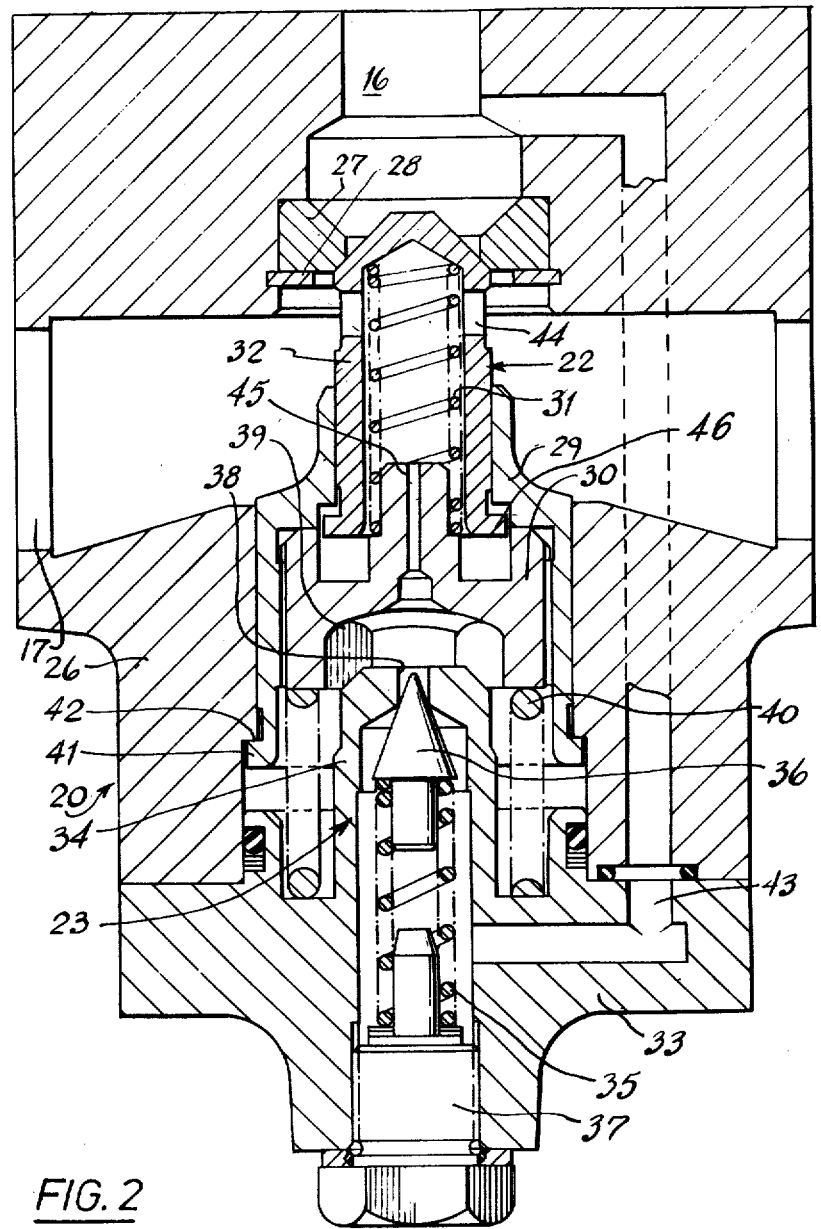

An embodiment of the invention will now be described by way of example only with reference to the accompanying drawing in which:

FIG. 1 is a circuit diagram of a hydraulic installation.
FIG. 2 is a section of a valve represented in FIG. 1.

Referring to FIG. 1 a prime mover 10 drives a reversible pump 11 by way of a shaft 12. The shaft 12 also drives a non reversible pump 13 which takes fluid from a sump 14 through a suction line 15 and delivers it into a pressure line 16.

The pump 11 is hydraulically connected by conduits 17, 18 to a reversible motor 19. Valve assemblies 20a and 20b are connected between each of the conduits 17, 18 respectively and the pressure line 16, and comprise respectively check valves 22a, 22b and a relief valves 23a, 23b.

Flow from the pressure line 16 to the sump is controlled by a relief valve 24 which acts to maintain the pressure in the line at a predetermined level.

The operation of the circuit will now be described. The prime mover 10 rotates the shaft 12 to cause the pump 11 to deliver fluid to either one of the conduits 17 or 18 and so rotate the motor 19 in one direction or the other. The fluid is then returned from the motor 19 to the pump 11 by the other of the conduits 17, 18, If it is assumed that the pump 12 delivers fluid to the conduit 17, which is therefore at a higher pressure than the conduit 18, excessive pressure is relieved from the line 17 through the relief valve 23a and into the pressure line 16 to the sump 14. Should the pressure in conduit 18 fall below the pressure in the line 16, due to for example lack of fluid in the conduit 18, fluid will flow from the pressure line 16 across the check valve 22b into the conduit 18. Should the relief valve 23a be venting the conduit 17 at the same time as the pressure in the conduit 18 is low then fluid may flow directly from the relief valve 23a across the check valve 22b into the conduit 17.

The function of the valve assemblies 20a and 20b are reversed when the conduit 18 becomes the high pressure conduit, namely the relief valve 23b vents the excessive pressure and the check valve 22a allows flow into the low pressure conduit 17. It will be seen therefore that a valve assembly 20 which is described in detail below is capable of performing a plurality of functions.

FIG. 2 shows a section through the valve assembly 20 and parts identical to those in FIG. 1 have been denoted with the same numbers.

The valve assembly 20 comprises a body 26 through which the conduit 17 passes. The pressure line 16 is also connected to the body 26. The body 26 houses the check valve 22 which comprises a seat member 27 held in the body by a circlip 28 and a hollow plunger 32. The seat member 27 and the plunger 32 co-operate to provide a seal between the conduit 17 and the pressure line 16.

The plunger 32 is slidably mounted within a cylindrical housing 29 which is sealed by a threaded plug 30. A spring 31 acts between the plug 30 and the head of the plunger 32 to bias it against the seat 27, movement being limited by a shoulder 46.

The housing 29 is itself held within the body 26 by a spring 40 and an endcap 33 which includes a projection 34. The projection is bored to receive a relief valve 23 comprising a spring 35, a poppet 36 and a retaining cap 37. The poppet 36 seals a hole 38 in the projection 34 which connects the interior of the projection 34 with a chamber 39 formed between the plug 30, the body 26 and the encap 33. The spring 40 acts between the endcap 33 and the plug 30 to bias the housing 29 away from the endcap 33. Movement of the housing 29 is limited by a flange 41 on the housing 29 co-operating with a shoulder 42 on the body.

The interior of the projection 34 is vented by a bypass passage 43 which connects with the pressure line 16. The chamber 39 is hydraulically connected with the conduit 17 by ports 44 in the plunger 32 and an orifice 45 in the plug 30.

The operation of the valve 20 is as follows. Assuming the conduit 17 is at a high pressure, i.e. receiving fluid from the pump 12, the plunger 32 is pressed against the seat 27 by the spring 31 and the pressure of the fluid acting on the inside of the plunger 32. The pressure in the conduit 17 is exerted in the chamber 39 against the poppet 36.

Should this pressure become excessive the poppet 36 will overcome the force of the spring 35 and allow fluid to flow from the chamber 39 into the bypass passage 43 to the pressure line 16. The orifice 45 restricts flow into the chamber 39 from the conduit 17 so that the chamber 39 is at a lower pressure than the conduit 17. The pressure of fluid acting on the housing 29 thus overcomes the force of the spring 40 and moves the housing 29 toward the endcap 33. The plunger 32 moves away from the seat 27 and allows fluid to flow from the conduit 17 into the pressure line 16 and to the sump 13. When the pressure falls in conduit 17, the spring 40 moves the housing 29 along the body 26 until the flange 41 co-operates with the shoulder 42 to reseat the plunger 32.

If the conduit 17 is at a low pressure, i.e. conveying fluid from the motor to the pump 11 the poppet 36 will remain seated at all times. However, should the pressure of fluid in the pressure line 16 exceed the pressure in the conduit 17, the plunger 32 will move against the bias of the spring 31 away from the seat 27 to allow flow from the line 16 into the conduit 17.

Thus it will be seen that the valve assembly 20 is capable of operating in two modes, either as a check valve or as a relief valve.

What we claim is:

1. A valve comprising a body, wall means defining a first and second conduit in said body, a valve member operable to control flow of fluid between said conduits and movable between a first position wherein said conduits are hydraulically disconnected and a second position wherein said conduits are hydraulically connected, a first element on said valve member, surface means on said element to react with fluid pressure in said conduits to bias said valve member toward said second position, a second element on said valve member and resilient biasing means operative to urge apart said first and second elements, stop means for limiting relative movement between said first and second elements, wall means defining a chamber, a restrictive passage between said first conduit and said chamber, fluid pressure in said chamber biasing said valve member toward said first position, and relief valve means operable to allow fluid to flow from said chamber upon attainment of a predetermined pressure therein.

2. The valve of claim 1 wherein said restrictive passage is formed within said valve member.

3. A valve according to claim 1 wherein a resilient member acts to bias said valve member toward said first position.

4. A valve according to claim 1 wherein said chamber is formed between said valve member and said body.

5. A valve according to claim 4 wherein said relief valve is housed within said body and communicates with said chamber.

6. A valve according to claim 4 wherein a spring is located in said chamber and acts between said body and said valve member.

7. A valve according to claim 1 wherein a passage hydraulically connects said relief valve and said second conduit.

8. A valve according to claim 1 wherein said second element is biased against a seat to seal said first conduit from said second conduit.

9. A valve according to claim 1 wherein said second element presents a surface to hydraulic fluid in said first conduit.

* * * * *